United States Patent [19]

Katsen et al.

[11] Patent Number: 4,500,354

[45] Date of Patent: Feb. 19, 1985

[54] HEAT SENSITIVE RECORDING PAPERS

[75] Inventors: Boris J. Katsen, N. Tonawanda; Robert T. Brinkworth, Lakeview; Daniel J. Kay, Amherst; James A. Riester, N. Tonawanda, all of N.Y.

[73] Assignee: Graphic Controls Corp., Buffalo, N.Y.

[21] Appl. No.: 423,851

[22] Filed: Sep. 27, 1982

[51] Int. Cl.[3] .......... C09D 11/00

[52] U.S. Cl. .......... 106/21; 427/148; 427/150; 427/151

[58] Field of Search .......... 106/21, 14.5; 427/148, 427/150, 151; 282/27.5

[56] References Cited

U.S. PATENT DOCUMENTS 4,180,405 12/1979 Lawton .......... 106/14.5

FOREIGN PATENT DOCUMENTS 2809038 7/1978 Fed. Rep. of Germany .

*Primary Examiner*—Lorenzo B. Hayes

*Assistant Examiner*—Amelia B. Yarbrough

*Attorney, Agent, or Firm*—Michael G. Berkman

[57] ABSTRACT

Water-stable phenol-amine complexes of limited water solubility for use in a thermal-sensitive paper coating containing a chromogenic compound.

The complexes contain phenolic hydroxy groups and amine groups in an essentially 2:1 ratio, the amines being low boiling amines. The phenols are of the class capable of forming amine complexes having a ratio of two hydroxyl groups for each amine group. The resulting coating compositions effectively resist premature color formation during formulation, and the coated papers produced exhibit enhanced stability.

19 Claims, No Drawings

HEAT SENSITIVE RECORDING PAPERS

FIELD OF THE INVENTION

The present invention relates to heat-sensitive recording papers. More particularly, the invention is directed to coatings for heat-sensitive recording papers to ensure the formation of clear, bright images upon the application of heat to the coated surface.

The heat sensitive coating compositions of the invention are of the types which include an amine-phenol complex in conjunction with a leuco, chromogenic compound. Upon the application of heat to the coating, the complex undergoes dissociation, releasing the phenol. The free (uncomplexed) phenol is rendered capable of reacting with the lueco compound to form a colored dye. Heat activated color-generating chemical systems with some of the general features of the compositions of the present invention are described in W. R. Lawton U.S. Pat. No. 4,097,288. The entire disclosure of that patent is hereby specifically incorporated herein by reference, to the extent it is not inconsistent herewith.

Various types of heat-sensitive coatings for application to paper substrates are known in the prior art. But none of these coatings has proven acceptable in all respects. One problem experienced in the use of recording sheets thus coated is premature color development, particularly when the coated paper is exposed to high-humidity environment. In other instances, it has been found that the mere mechanical mixing or the physical combining of the various component elements of the compositions causes some significant development of color, producing a coated sheet with an objectionable degree of background color. It will be appreciated that substantial "background" color has the undesirable effect of reducing the achievable contrast between the background and any subsequently generated, heat-derived visual trace.

It has also been found that the relatively less stable systems of prior art compositions have, after the production of a visually contrasting trace, permitted unsought interreaction or recombination of chemical components of the system, for example, recomplexing of the amine with the phenol, to cause fading of the heat-derived trace. It is the aim of the present invention to minimize and to alleviate the above-described and other objectional shortcomings of prior art heat-sensitive, coated papers and to provide heat-sensitive compositions exhibiting improved stability and facilitating the generation of the sharply-defined, high-contrast trace indicia of enhanced clarity and of a more persistent or more permanent nature.

SUMMARY OF THE INVENTION

The improved heat-sensitive coating compositions of the invention are characterized in that they include water-stable phenol-amine complexes having significantly limited water solubility, a property which contributes materially to the stability of the complexes toward high-humidity ambient systems.

In accordance with the invention, the phenol-amine complexes contain phenolic hydroxy groups and amine groups in an essentially 2:1 ratio. The amines are low boiling point amines, preferable aliphatic amines of up to about C-6, including primary amines, secondary amines and mixtures of such amines. Useful amines include primary amines forming a phenol-amino complex of a 2:1 ratio of phenol groups to amino groups, secondary amines forming a 1:1 ratio of phenol-amino complexes. Typical preferred amines are n-butyl amine, n-propyl amine, cyclohexyl amine, ethylene diamine, diisopropylamine and the like.

The phenols of the phenol-amine complexes of the invention are those which are capable of forming, in an aqueous system, amine complexes having a ratio of two hydroxyl groups for each amine group. Among such phenols are sulfonyl diphenol, thio diphenol, 4,4′ dihydroxy sulfonyl diphenol, 2,2′ hydroxy sulfonyl diphenol, 4,4′-dihydroxy diphenylol propane and paraphenyl phenol.

It is a feature of the invention that in preferred embodiments of the heat-sensitive coating compositions include, in addition to the phenol-amine complexes and the chromogenic compound, special chemical agents for stabilizing the preparations, for reducing abrasion and wear of thermal printheads and/or stencils and for minimizing residue buildup on printheads or stencils to obviate fouling. Such agents may be classified as binders (functioning as stabilizers) and fillers (to impart low friction properties to the coating).

Important components of preferred formulations in accordance to the invention are fatty acid amides, for example, mixtures of behenic and arachidic acid amides.

Other chemicals for augmenting the practical functional capabilities of the heat-sensitive coating compositions of the invention are the alkali metal salts and ammonium salts of polyester resins. Polyester resin derivatives as well as resin acid esters, in conjunction with suitable buffer agents (e.g., pH 8.5–9.2) serve to control the water solubility properties of the heat-sensitive coating compositions. Styrene and maleic anhydride co-polymers (alkali metal or ammonium salts) have been found to function well as binders to stabilize the chromogenic compound and the complex itself.

The coated papers of the invention show essentially no background discoloration when subjected to elevated humidity. Nor do the improved coating compositions of the invention undergo premature color formation during formulation when dyes of the composition are ground together with color developers. This important advantage has been unattainable heretofore. The enhanced stability of the formulations of the invention has been found to exist irrespective of the grinding time and/or storage time of the formulations and/or the handling and storage of the coated paper itself.

Trace indicia produced on papers coated with the heat-sensitive compositions of the invention are characterized by sharp definition and improved overall resolution.

Other important features of the coatings of the invention are that they exhibit significantly improved anti-fouling properties and an unusually low degree of abrasion, thus extending the useful life of the printing heads.

Further features and advantages of the invention will become apparent from a consideration of the following detailed description.

DESCRIPTION OF THE PREFERRED EMBODIMENTS

An appreciation of the important differences between prior art coating compositions, including those utilizing molecular complexes, even complexes of phenols and amines, will be facilitated upon consideration of prior art formulations and a comparision of these with formulations with those of the present invention. Examples of prior art preparations are set forth here below as A, B and C. Examples of the preparations according to the present invention are identified by arabic numerals.

EXAMPLE A (Prior Art)

1,000 grams of a 6% solution of styrene-maleic anhydride co-polymer sodium and calcium salt, 150 grams of sulfonyl diphenol, 160 grams of stearamide, 10 grams of $K_2CO_3$, 40 grams of $Al_2O_3$, hydrated, and 10 grams of silicone-type defoamer were ground in a ball mill for 24 hours.

Separately, 75 grams of a 5% solution of sodium and calcium salt of styrene-maleic anhydride copolymer and 25 grams of Crystal Violate Lactone (CVL) were ground in a ball mill for 24 hours.

The two above-described slurries were mixed, and the pH of the final dispersion was adjusted to 8.6–9.0 by the application of $K_2CO_3$ solution. Coatings were made on paper, with an application rate of 6.5–8.9 g/m$^2$.

The applied coating exhibited extensive premature discoloration, giving an optical density of the background in the range of 0.10–0.15 units of optical density (O.D.).

The background density increased to 0.25–0.035 units of O.D. after exposure of the coating to elevated temperature and humidity (50% RH, 50° C.) for 24 hours.

The physical interaction of the coated paper with the printhead, produced a substantial residue on the printhead and caused objectionable fouling of the printhead after printing of approximately $10^6$ characters.

EXAMPLE B (Prior Art)

Example B of the prior art was prepared as in Example A except that the Crystal Violet Lactone was ground together with the sulfonyl diphenol, binder, filler and fatty acid amide. An immediate reaction between the dye and color developer was observed.

The final material was unacceptable for use in manufacturing heat-sensitive papers; i.e., the background of the paper was 0.35–0.5 units of O.D.

EXAMPLE C (Prior Art)

In Example C of the "prior art," a molecular complex of paraphenylphenol and cyclohexyl amine was used in a composition of Example A.

The paper was coated at an application rate of 6.5–8.5 g/m$^2$. No discoloration of the background was observed prior to exposure of the paper to elevated humidity, but strong color was developed after subjecting the samples to 50% RH at 50° C.

The O.D. of the background was in the range of 0.2–0.35 units, rendering the paper impractical for use. The fading of the images using the formulations of Examples A, B and C was almost 60%, based upon initial density and as determined after exposure of the printed samples to conventional fluorescent light during a 24-hour period.

It was observed that upon grinding the CVL with the molecular complex of paraphenylphenol, an immediate undesirable reaction between the dye and color developer occurred.

In order to disclose more clearly the nature of the present invention, specific examples are set forth below. It is to be understood that the examples are intended neither to delineate the scope of the invention nor to limit the ambit of the appended claims.

EXAMPLE 1 (of the invention)

A molecular complex of sulfonyl diphenol and n-butylamine was prepared by reacting one mole of n-butylamine with one mole of sulfonyl diphenol. The reaction product was characterized as a crystalline material, possessing a melting point of 165° C. The crystals began to sublime at 119° C. (by DTA). The product was found to be devoid of free OH groups, as determined by examination using infra red (IR) and nuclear magnetic resonance (NMR) spectroscopy techniques. The unusual structure of this complex is related to the formula:

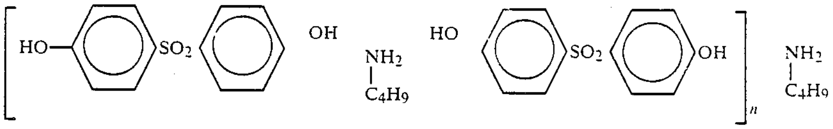

where n is greater than one.

The above complex differs from those previously taught (see, e.g., William R. Lawton, U.S. Pat. No. 4,047,088) which discloses a molecular complex of the formula:

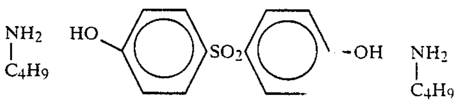

used in prior art Example C herein.

EXAMPLE 2 (of the present invention)

270 grams of the molecular complex from Example 1 were ground in 1,400 grams of a 6% solution of styrene-maleic anhydride sodium and calcium salt, together with 270 grams of fatty acid amide (a mixed amide of behenic and arachidic acids known as Humko Sheffield Kemamide B), 11 grams of $K_2CO_3$, 69 grams of aluminum hydroxide, 13 grams of a silicone-type defoamer, and 20 grams of CVL to produce a dispersion.

No discoloration of the dispersion was observed even after three months' storage, evidencing remarkable stability as compared with prior art preparations.

Paper coated at an application rate of 6.5–8.5 g/m$^2$ showed an initial background density no greater than about 0.03–0.05 unit of O.D.

Full color development of the above-described paper occurred at 120 C and exhibited 1.38–1.40 units of O.D. (measured by Speedmaster densitometer at the neutral setting of filters). The background density after 24-hour exposure of the paper to 50° C. at 50% RH was 0.2 unit of O.D.

EXAMPLE 3 (of the present invention)

To the formulation of Example 2, a 20% solution of $K^+$ salt of a polyester resin (e.g., Alresat KM-140, manufactured by American Hoescht Company) was added, and the composition was applied as a coating to paper.

After the exposure of the coated paper to 50% RH at 50° C., the O.D. of the background was 0.05–0.08 (compared to an initial reading of 0.03–0.05 unit of O.D.), indicating remarkable stability.

More than $10^7$ characters were printed on the coated paper using printers such a Texas Instruments printer model TI 783, and calculators. There was no objectionable residue build-up on the surface of the printhead. The coated paper also exhibited a very low level of abrasion, as determined by measuring the degree of graphite stencil wear.

Similar results of "no wear" were obtained when other printing devices were used; i.e., printing calculators, NCR-260 printing terminals, and the like. When different, unmodified polyester resins were used (not in the form of salt of the polymer), excessive fog was detected at 50% RH and 50° C., with a prevailing 0.2 unit of O.D.

EXAMPLE 4 (of the present invention)

The composition of Example 4 was similar to that of Example 3 except that a sodium salt of a (Hercules Powder) polyester resin, known as Pentalyn 269, was used in the place of Alresat KM-140. The resulting coated, heat-sensitive paper had excellent properties, similar to those of Example 3.

EXAMPLE 5 (of the present invention)

In Example 5, still another polyester resin Durze Chemical Co.'s 19788 $NH_4^+$ salt was used in place of the esters employed in Examples 3 and 4.

The coated, heat-sensitive paper produced exhibited the same desirable anti-fouling and antifogging properties as did the papers of Example 3 and 4.

EXAMPLE 6 (of the present invention)

The following embodiment of the present invention illustrates the enhanced performance of a heat-sensitive paper exhibiting a blue trace or print, when a combination of blue and red dyes is used instead of CVL alone.

The paper was prepared as in Example 3 but using a Crystal Violet Lactone of the formula:

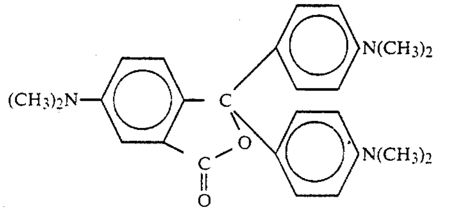

and a red dye of the formula:

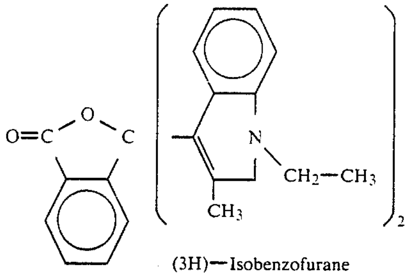

(3H)—Isobenzofurane 3,3-bis(1 ethyl-2-methyl 1H—indol-3-yl)

in a ratio from 1:0.05 to 9:1.

The following table illustrates the observed interrelationship between temperature and optical density (O.D.). The exposure time of the heat-sensitive paper to any given value of temperature was five seconds in each case.

TABLE 1

Temperature vs. Optical Density (O.D.)

| Sample Weight of Coating (g/m²) | Example | O.D. at various designated temperatures (Temperature °C.) | | | | | | |
|---|---|---|---|---|---|---|---|---|
| | | 85 | 105 | 115 | 125 | 135 | 145 | 155 |
| 6.9 | 3 | .04 | .26 | .73 | .96 | 1.12 | 1.30 | 1.35 |
| 7.0 | 5 | .05 | .22 | .93 | 1.06 | 1.30 | 1.42 | 1.43 |
| Commercial Sample of NCR 1101 heat-sensitive paper | | .07 | .86 | .93 | 1.05 | 1.12 | 1.24 | 1.28 |

The recorded data show that the optical density of the combination of dyes is greater than the O.D. of CVL used alone, in the range of operational temperatures (115°–155° C.).

In other preferred embodiments of the invention, black traces are produced. For example, 2-(2-chlorophenylamino)-6-diethylamine fluorane or 2-(2-chlorophenylamino)-6-di-n-butyl amino fluorane, and the composition of example 6 (without CVL and red dye) provide black image formation.

Additionally, stable and sharp green, red, violet, and blue-black images, as well as blue and black images, have been demonstrated in accordance with the present invention, depending on the use of lueco dyes or mixtures of dyes.

While papers of various formulations and physical characteristics may be used as substrates for the coating of the invention, papers having a porosity greater than about 200 relative units on a Sheffield porosimeter are particularly suitable.

What is claimed is:

1. A water-stable phenol-amine complex having limited water solubility and for use in a thermal-sensitive paper coating containing a chromogenic compound, said complex being characterized in that the ratio of $OH^-$ groups of the phenol to amine groups of the amine is essentially 2:1, and being further characterized in that the amine is a lower aliphatic amine of up to C-6 and selected from the group consisting of primary amines, secondary amines forming aminophenolic complexes in a 1:1 ratio, and mixtures thereof, said phenol being selected from the group consisting of phenols which have the capability of forming, in water, a molecular complex with amines, in a ratio of two OH− groups to one amine group when a primary amine is used, said complex in said coating being responsive to heat applied thereto to effect dissociation of said complex to liberate said phenol for reaction with said chromogenic compound to produce colored trace indicia.

2. The complex as set forth in claim 1 wherein said phenol is selected from the group consisting of thio diphenol, 4,4′ dihydroxy sulfonyldiphenol, 2,2′ dihydroxy sulfonyl diphenol, 4,4′-dihydroxy diphenylolpropane, and paraphenylphenol.

3. The complex as set forth in claim 1 wherein said phenol is a sulfonyl diphenol.

4. The complex as set forth in claim 1 wherein said phenol is thio diphenol.

5. The complex as set forth in claim 1 and further comprising a fatty acid amide in said coating composition.

6. The composition as set forth in claim 5 wherein said fatty acid amide is behenic acid amide.

7. The complex as set forth in claim 5 wherein said fatty acid amide is N, N-bisstearamide.

8. The composition as set forth in claim 5 wherein said fatty acid amide comprises a mixture of behenic acid amide and bisstearamide in a ratio of from about 20:1 to about 1:20.

9. The composition as set forth in claim 5 wherein said fatty acid amide comprises a mixture of behenic and arahidic amides in a ratio of from about 9:1 to about 1:9.

10. The improvement as set forth in claim 1 and further comprising finely divided filler means for absorbing any aliphatic amine released during activation of said complex, thereby improving the clarity of any trace indicia developed.

11. The improvement as set forth in claim 10 wherein said filler means comprises a pigment selected from the group consisting of finely divided organic pigments, inorganic pigments and mixtures thereof.

12. The improvement as set forth in claim 11 wherein said filler means is selected from the group consisting of rice starch, hydrated alumina, neutral clay, and mixtures thereof.

13. The improvement as set forth in claim 11 wherein said filler is present in a concentration of from about 2 percent to about 50 percent based upon the dry coating weight.

14. The improvement as set forth in claim 1 wherein said coating composition is applied to a substrate comprising a paper of porosity greater than about 200 relative units as measured on a Sheffield porosimeter.

15. The complex as set forth in claim 1 wherein said amine comprises n-butyl amine.

16. The complex as set forth in claim 1 wherein said amine comprises cyclohexyl amine.

17. The complex as set forth in claim 1 wherein said amine comprises ethylenediamine.

18. The complex as set forth in claim 1 wherein said amine comprises n-propyl amine.

19. The method of making a heat-sensitive recording of sulphonyldiphenol, thio diphenol, 4,4′ dihydroxy sulfonyldiphenol, 2,2′ hydroxy sulfonyl diphenol, 4,4′-dihydroxy diphenylolpropane, paraphenylphenol with a lower aliphatic amine of up to C-6 and selected from the group consisting of primary amines, secondary amines and mixtures thereof, in an aqueous system and in a ratio of phenolic OH− group to amine groups of 2:1 to form a molecular complex of said diphenol and said amine characterized by low water solubility, mixing with said complex a chromogenic compound to provide a heat-sensitive composition as a heat-sensitive coating to a sheet-like supporting substrate, said coating being responsive to heat applied thereto to effect dissociation of said complex contained therein to liberate said phenol from said complex for reaction with said chromogenic compound to produce on said substrate visible trace indicia correlated with definitive zones in which heat has been applied.

* * * * *